US010826874B2

(12) United States Patent
Spillman

(10) Patent No.: US 10,826,874 B2
(45) Date of Patent: Nov. 3, 2020

(54) DIRECT PRODUCTION NETWORK ACCESS USING PRIVATE NETWORKS AND ENCAPSULATION

(71) Applicant: MASTERCARD INTERNATIONAL INCORPORATED, Purchase, NY (US)

(72) Inventor: Gregory T. Spillman, DeSoto, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 154 days.

(21) Appl. No.: 16/204,125

(22) Filed: Nov. 29, 2018

(65) Prior Publication Data

US 2020/0177553 A1 Jun. 4, 2020

(51) Int. Cl.
*H04L 29/06* (2006.01)
*H04L 12/46* (2006.01)
*H04L 12/931* (2013.01)
*H04L 12/723* (2013.01)

(52) U.S. Cl.
CPC ...... *H04L 63/0272* (2013.01); *H04L 12/4633* (2013.01); *H04L 12/4641* (2013.01); *H04L 45/50* (2013.01); *H04L 49/354* (2013.01); *H04L 63/0428* (2013.01)

(58) Field of Classification Search
CPC combination set(s) only.
See application file for complete search history.

(56) References Cited

U.S. PATENT DOCUMENTS

| 7,840,701 | B2 | 11/2010 | Hsu et al. |
| 8,218,558 | B2 | 7/2012 | Tan et al. |
| 8,560,663 | B2 * | 10/2013 | Baucke ............... H04L 45/50 370/255 |
| 9,098,312 | B2 | 8/2015 | Bullotta et al. |
| 9,438,506 | B2 * | 9/2016 | Ryland ............... H04L 41/0893 |

(Continued)

FOREIGN PATENT DOCUMENTS

| KR | 1020150116539 A | 10/2015 |
| KR | 1020180104377 A | 9/2018 |
| WO | 2018022980 A1 | 2/2018 |

OTHER PUBLICATIONS

PCT International Search Report and Written Opinion, Application No. PCT/US2019/054934, dated Jan. 21, 2020, 10 pps.

*Primary Examiner* — Ali Shayanfar
(74) *Attorney, Agent, or Firm* — Armstrong Teasdale LLP

(57) ABSTRACT

A direct cloud access (DCA) computing system for enabling access by a developer computing device hosted on a development network to a plurality of production networks hosted on a cloud services platform is provided. The DCA system includes a development private network interface to a private network, and a production private network interface to the private network. The DCA system further includes a plurality of DCA computing devices each coupled to a respective one of the plurality of production networks. Each DCA is programmed to establish a first VPN connection with a developer computing device on the development network via the private network, receive a client VPN packet addressed to the first DCA network address, and transmit the packet to the production computing device based on a resource address.

18 Claims, 8 Drawing Sheets

(56) References Cited

U.S. PATENT DOCUMENTS

| | | | |
|---|---|---|---|
| 9,686,100 B2* | 6/2017 | Graham | H04L 45/58 |
| 9,722,871 B2 | 8/2017 | Miller et al. | |
| 9,961,058 B2 | 5/2018 | Mahoney et al. | |
| 9,967,350 B2 | 5/2018 | Rao et al. | |
| 9,998,335 B2* | 6/2018 | Brandwine | H04L 45/02 |
| 10,616,180 B2* | 4/2020 | Chanak | H04L 63/029 |
| 2008/0082640 A1 | 4/2008 | Chang et al. | |
| 2013/0142201 A1* | 6/2013 | Kim | H04L 12/4645 |
| | | | 370/392 |
| 2014/0196121 A1* | 7/2014 | Alkhatib | H04L 9/3234 |
| | | | 726/4 |
| 2016/0027399 A1 | 1/2016 | Wilde et al. | |
| 2017/0093702 A1* | 3/2017 | Teng | H04L 12/4641 |
| 2018/0013798 A1* | 1/2018 | Pallas | H04L 47/193 |
| 2019/0334868 A1* | 10/2019 | Tewari | G06F 9/45558 |
| 2019/0356634 A1* | 11/2019 | Foxhoven | H04L 67/42 |

* cited by examiner

DIRECT PRODUCTION NETWORK ACCESS USING PRIVATE NETWORKS AND ENCAPSULATION

BACKGROUND

This disclosure relates generally to network routing of data, and more specifically, to routing data packets between private networks using encapsulation.

Software developers and administrators are responsible for increasingly complex computing systems. As the scale of these computing systems grows, there is a need to facilitate remote management while also maintaining security (e.g., network isolation).

Organizations may operate multiple computing systems, where each computing system is isolated to a private network (e.g., production network). For example, a cloud platform may provide multiple production networks each having multiple virtual machines. At least some cloud platforms provide a management console and/or web interface to allocate computing resources. However, developers may need to directly connect to virtual machines on the production networks to upload data and/or configuration files.

Additionally, production networks may have varying authentication and encryption requirements. A specific production network may have a high data encryption requirement, which would be impractical to apply to traffic on other production networks. Manually configuring developer computing devices for the authentication and encryption requirements of production networks may be time consuming and error-prone, compromising data security.

BRIEF DESCRIPTION

In one aspect, a direct cloud access (DCA) computing system for enabling access by a developer computing device hosted on a development network to a plurality of production networks hosted on a cloud services platform is provided. The DCA computing system includes a development private network interface hosted on the development network and configured to couple the development network to a private network, wherein the developer computing device has a first developer network address associated with the development network, a production private network interface hosted on the cloud services platform and configured to couple the plurality of production networks to the private network, and a plurality of DCA computing devices each coupled to a respective one of the plurality of production networks, each DCA computing device having a corresponding second DCA network address associated with the respective production network, each DCA computing device including a processor and a memory in communication with the processor. The processor of each DCA computing device is configured to establish a first VPN connection with the developer computing device via the private network, wherein the DCA computing device is assigned a first DCA network address associated with development network, and wherein the developer computing device is assigned a second developer network address associated with the respective production network and is provided with a resource address of a production computing device on the respective production network, receive a client VPN packet addressed to the first DCA network address, wherein the client VPN packet encapsulates a packet generated by the developer computing device and addressed to the resource address on the respective production network, and transmit the packet to the production computing device based on the resource address.

In another aspect, a computer-implemented method for enabling access by a developer computing device hosted on a development network to a plurality of production networks hosted on a cloud services platform is provided. The method is implemented using a direct cloud access (DCA) computing system, wherein the DCA computing system includes a plurality of DCA computing devices each coupled to a respective one of the plurality of production networks, each DCA computing device having a corresponding second DCA network address associated with the respective production network, each DCA computing device comprising a processor and a memory in communication with the processor. The method includes establishing, by a first DCA computing device of the plurality of DCA computing devices, a first VPN connection with the developer computing device via a private network, wherein the first DCA computing device is assigned a first DCA network address associated with the development network, wherein the developer computing device is assigned a second developer network address associated with the respective production network and is provided with a resource address of a production computing device on the respective production network, wherein the development network includes a development private network interface configured to couple the development network to the private network, and wherein the developer computing device has a first developer network address associated with the development network. The method further includes receiving, by the first DCA computing device, a client VPN packet addressed to the first DCA network address, wherein the client VPN packet encapsulates a packet generated by the developer computing device and addressed to the resource address on the respective production network, wherein the cloud services platform includes a production private network interface configured to couple the plurality of production networks to the private network. The method further includes transmitting, by the first DCA computing device, the packet to the production computing device based on the resource address.

In yet another aspect, a non-transitory computer-readable storage media having computer-executable instructions embodied thereon is provided. The instructions are executable by at least one processor of one of a plurality of DCA computing devices each coupled to a respective one of a plurality of production networks, each DCA computing device having a corresponding second DCA network address associated with the respective production network, each DCA computing device comprising a memory in communication with the at least one processor. When executed, the computer-executable instructions cause the at least one processor to establish a first VPN connection with a developer computing device hosted on a development network, the first VPN connection established via a private network, wherein the DCA computing device is assigned a first DCA network address associated with the development network, wherein the developer computing device is assigned a second developer network address associated with the respective production network and is provided with a resource address of a production computing device on the respective production network, wherein the development network includes a development private network interface configured to couple the development network to the private network, and wherein the developer computing device has a first developer network address associated with the development network. The computer-executable instructions further cause the at least one processor to receive a client VPN packet addressed to the first DCA network address, wherein the client VPN packet encapsulates a packet generated by the developer computing device and addressed to the resource address on the respective production network, and wherein a cloud services platform includes a production private network interface configured to couple the plurality of production networks to the private network. The computer-executable instructions further cause the at least one processor to transmit the packet to the production computing device based on the resource address.

DETAILED DESCRIPTION

Figure 1:
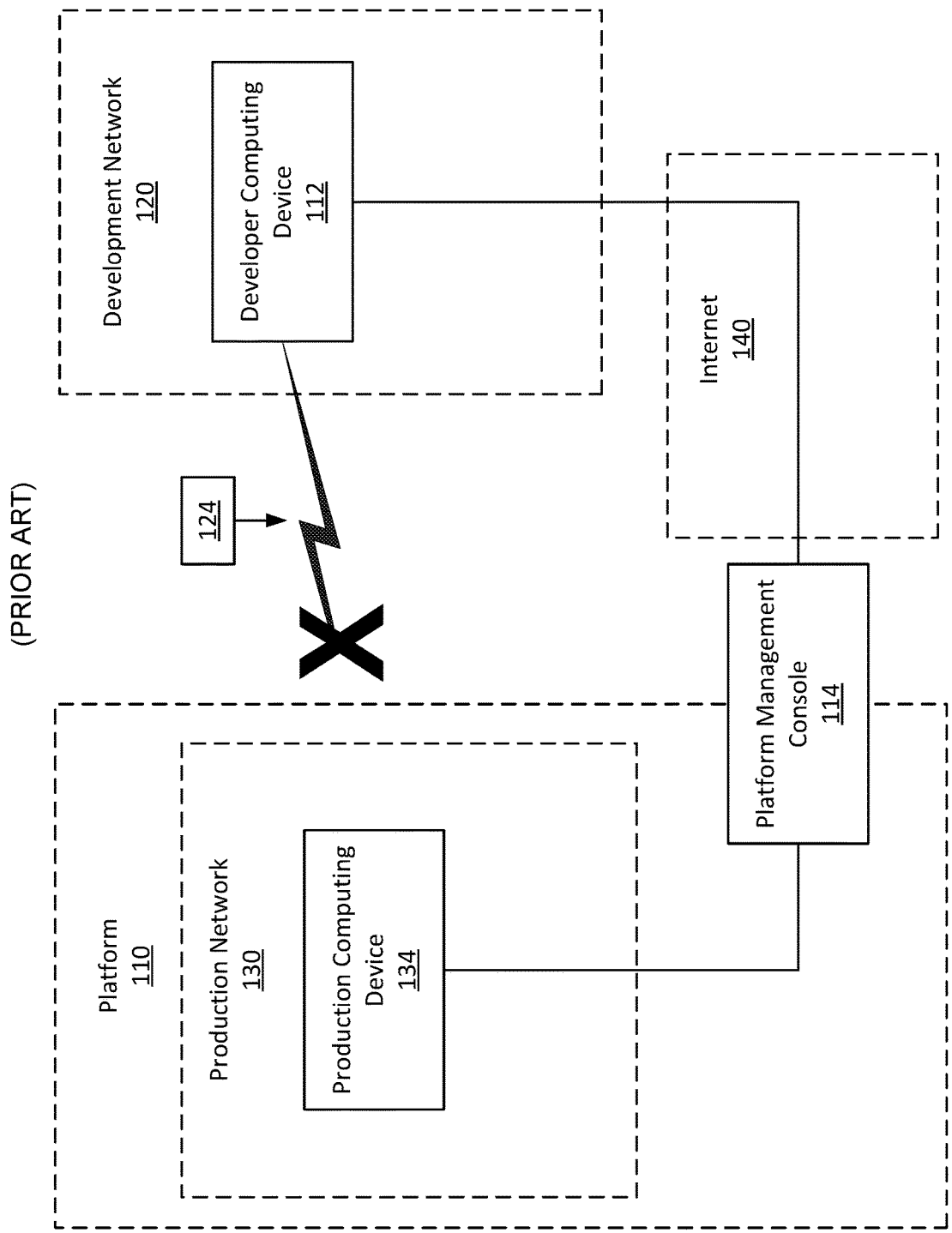
FIG. 1 is a schematic diagram illustrating a known computing system including a production network.

The following detailed description illustrates embodiments of the disclosure by way of example and not by way of limitation. The description enables one skilled in the art to make and use the disclosure. It also describes several embodiments, adaptations, variations, alternatives, and uses of the disclosure, including what is presently believed to be the best mode of carrying out the disclosure.

A direct cloud access ("DCA") computing device is provided. In some embodiments, the DCA computing device may facilitate network routing of data, and more specifically, interchangeable connection of developer computing devices to production networks with conflicting address ranges.

Production networks, such as virtual networks provided by cloud platforms, may be used to isolate and/or modularize computing systems. For example, a multitude of production networks may be created to organize multiple business applications, and/or components of business applications. The production networks may each use the same address range, such as a reserved and/or private address range. In other words, network addresses may be unique within each production network, but are commonly conflicting between production networks. For example, each production network may have a device with the IP (internet protocol) address 10.2.3.4. A computing device simultaneously connected to production networks having conflicting addresses may have unstable and/or unpredictable behavior.

Developers, using developer computing devices, may need to establish a direct connection to devices on the production networks. For example, bulk data may be directly uploaded to a database server, or an updated configuration file may be provided to a web server. Additionally, some development tasks may require interacting with production computing devices across multiple production networks.

The DCA computing device allows a computing device (e.g., a developer computing device) to virtually "plug-in" to a production computing network. The developer computing device may switch between production networks by connecting to the DCA computing device associated with the desired network. The DCA computing device is configured for developers to connect and disconnect from production networks while maintaining the desktop experience of the developer computing device. For example, processes and memory may be maintained on the developer computing device while changing between production networks. After connecting to the DCA computing device, the developer computing device is able to directly connect with (e.g., directly address) computing devices on the production network.

Production networks (e.g., virtual cloud networks) are increasingly used to enhance cybersecurity. For example, devices on the production network may be isolated from the internet. The DCA computing device is configured such that it does not require an internet connection, and thus does not introduce network vulnerabilities associated with exposing production network traffic to the internet.

In the example embodiment, multiple production networks are provided by a cloud platform, and at least one of the production networks has an address space that at least partially conflicts with the address space of another of the production networks. Each production network may include any number of production computing devices (e.g., database servers, web servers) having a network address. Each of the production networks may further have a DCA computing device connected both to the respective production network and to a private network.

The DCA computing device uses the private network to connect to a development network including developer computing devices. In some embodiments, the private network is a multiprotocol label switching ("MPLS") route/connection between the development network and a cloud platform providing a multitude of production networks. For example, the private network may be a cloud exchange connection. In alternate embodiments, the private network is a network-level (e.g., site-to-site, network-to-network) virtual private network ("VPN") connection. For example, the cloud platform may be connected to the development network using an Internet Protocol Security ("IPsec") VPN connection, or another site-to-site VPN connection.

In some embodiments, the private network is encrypted using a shared secret or common certificate, such that the private network is generally accessible to devices on the development network. In other words, the encryption on the private network is the same, regardless of the destination production network.

In at least some aspects, the private network facilitates a multitude of DCA computing devices, each associated with a production network, to be connected to the development network. However, the network addresses of each production network are not exposed to the development network, such that the production networks remain isolated and address conflicts are avoided. More specifically, the DCA computing devices are addressable on the development network.

The DCA computing device is configured to establish a client level (e.g., point-to-point, remote access) VPN connection to a developer computing device on the development network. In other words, the DCA computing device facilitates the developer computing device "plugging in" to the associated production network.

In at least some aspects, the client level VPN implements a specialized security layer. For example, the encryption mode, encryption strength (e.g., number of bits), and authentication method may be defined differently for each specific production network. In some cases, specific production networks may be subjected to regulatory restrictions on encryption and authentication methods. For example, payment card data may require a high level of encryption, which would be resource intensive to apply to all of the production networks (e.g., a public web server).

The client VPN connection established by the DCA computing device exposes the network addresses associated with the specific production network to the developer computing device. In other words, the DCA computing device facilities the developer computing device directly connecting to production computing devices on the production network associated with the DCA computing device.

The developer computing device may reconnect to a different DCA computing device to "plug in" to a different production network, without losing its current process and memory state. For example, applications and open files may be maintained while switching between production networks. Additionally, the files and applications stored locally on the developer computing device remain accessible while connected to the production network.

The technical problems addressed by the disclosure include at least one of: (i) inability to directly address production network computing devices from a developer computing device, (ii) reduced data security due to routing production network traffic over the internet, (iii) reduced data security due to misconfiguring production network encryption and authentication on the developer computing device, and (iv) redundant developer computing devices required to administer different production networks.

The systems and methods of the disclosure are implemented using computer programming or engineering techniques including computer software, firmware, hardware, or any combination or subset thereof, wherein the technical effects are achieved by: (i) establishing a first VPN connection with a developer computing device via a private network, (ii) receiving a client VPN packet, wherein the client VPN packet encapsulates a packet generated by the developer computing device and addressed to a production computing device on a production network; and (iii) transmitting the packet to the production computing device.

The resulting technical benefits achieved by the systems and methods of the disclosure include at least one of: (i) isolation of production network traffic from the internet, (ii) automatic configuration of production network encryption and authentication on developer computing devices, (iii) developer computing devices that are switchable between production networks while maintaining the desktop experience of the developer computing device, and (iv) ability to directly address production network computing devices from a developer computing device.

In one embodiment, a computer program is provided, and the program is embodied on a computer-readable medium. In an example embodiment, the system is executed on a single computer system, without requiring a connection to a server computer. In a further example embodiment, the system is run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Apple Inc. located in Cupertino, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus, are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database implementation (e.g., relational, document-based) may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating a known computing system including a production network. In the example embodiment, production computing device 134 is a virtual server (e.g., virtual machine) in a cloud computing environment. Production computing device 134 may be configured for high performance data processing, and may be further connected to a database system. Developer computing device 112 is a user computing device in a corporate environment, and is connected to development network 120. For example, developer computing device 112 may be a laptop or desktop computer.

Production computing device 134 is connected to production network 130. Production network 130 is, in the example embodiment, a virtual private network provided by a services platform 110 (e.g., cloud platform provider, Amazon Web Services, Microsoft Azure, Google Compute). For example, services platform 110 may segregate cloud resources associated with specific clients using networks such as production network 130. Additionally or alternatively, production network 130 may be a trusted segment, containing sensitive data (e.g., personally identifiable information (PII), payment card data).

In other words, network devices attached to production network 130 (e.g., production computing device 134) may not be directly accessible (e.g., addressable) over the internet 140. In the example embodiment, services platform 110 provides platform management console 114, which is accessible over internet 140. Platform management console 114 may be a web application for allocating resources available from services platform 110. For example, platform management console 114 may be used to provision a new virtual (e.g., cloud, provisioned) database or server computing device (e.g., production computing device 134).

In at least some embodiments, production computing device 134 may not be directly accessible outside of production network 130. For example, services platform 110 may prohibit network connections from devices outside production network 130 to ensure data security and integrity. Developer computing device 112 is unable to establish a bidirectional connection 124 to production computing device 134, such as a TCP/IP connection. In other words, developer computing device 112 is unable to directly load configuration data and application code to production computing device 134, and further unable to retrieve data and status information from production computing device 134. For example, development and configuration tools executing on developer computing device 112 are unable to connect to production computing device 134.

Figure 2:
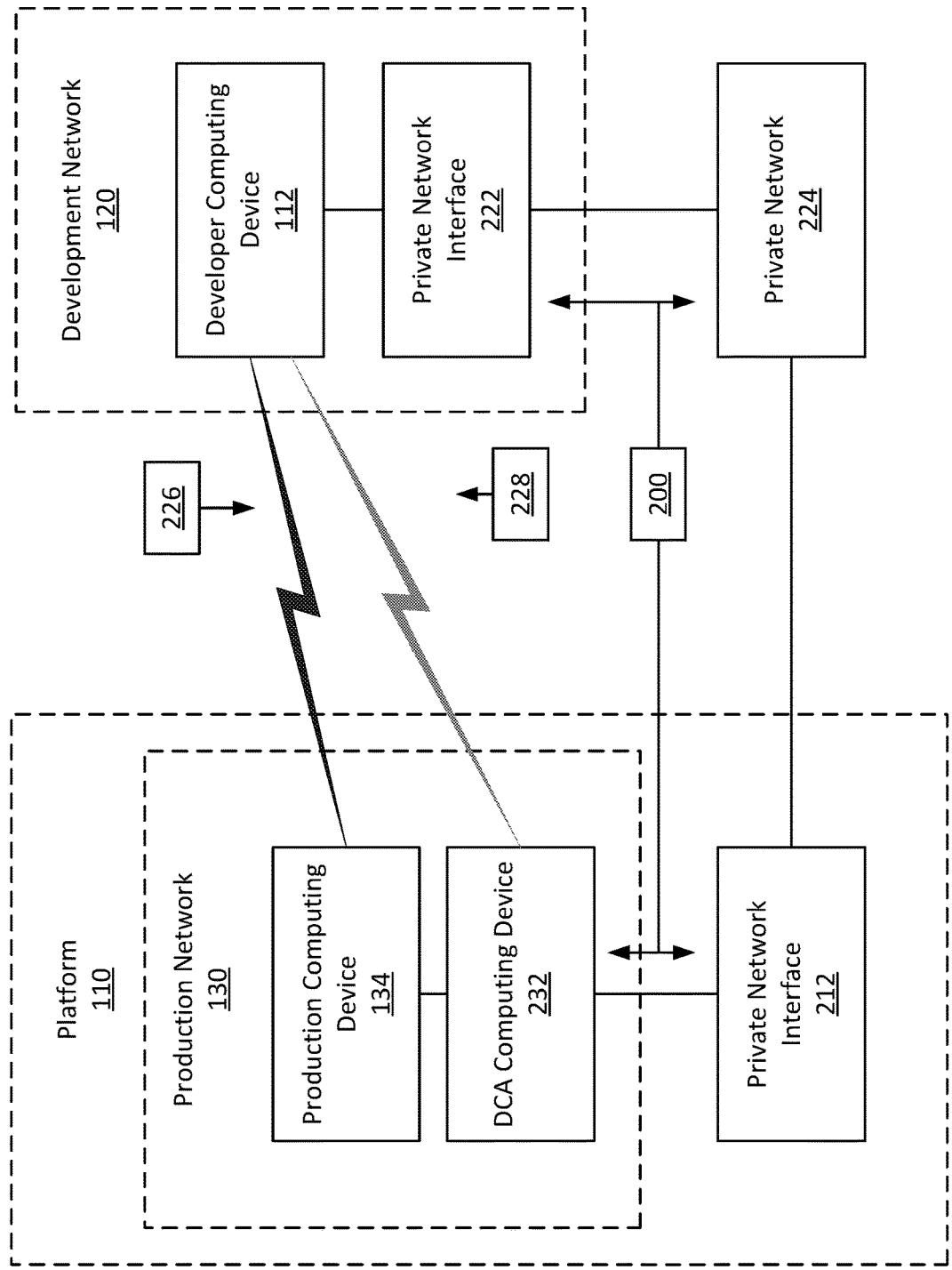
FIG. 2 is a schematic diagram illustrating an example direct cloud access (DCA) computing system.

FIG. 2 is a schematic diagram illustrating an example direct cloud access (DCA) computing system 200. Direct cloud access (DCA) computing system 200 includes DCA computing device 232, production private network interface 212, development private network interface 222, and private network 224. In the example embodiment, services platform 110 again is a cloud services provider, providing flexibly allocated computing resources, such as production computing device 134.

Production computing device 134 is connected to production network 130. Production network 130 is a private network, such as a virtual private network or virtual local area network (VLAN), provided by services platform 110. Production network 130 may be used to segregate network devices such as production computing device 134 from the internet.

In the example embodiment, production computing device 134 is not directly accessible (e.g., addressable) from outside production network 130, for example to reduce vulnerability surface, and/or increase data security. However, developer computing device 112 may need to directly connect to production computing device 134 for configuration, software updates, and troubleshooting. DCA computing device 232 allows direct access from developer computing device 112 while maintaining the isolation of production network 130 from the internet.

DCA computing device 232 is connected to production computing device 134 using production network 130. More specifically, DCA computing device 232 and production computing device 134 may both have private addresses associated with production network 130.

DCA computing device 232 is further connected to production private network interface 212. In the example embodiment, production private network interface 212 is a MPLS network interface provided by services platform 110. In alternate embodiments, production private network interface 212 may be a network VPN interface or any other network-to-network interface.

A private network 224 connects DCA computing device 232 to development network 120, such that DCA computing device 232 may have an additional private network address associated with development network 120. More specifically, development network 120 includes development private network interface 222, such that DCA computing device 232 may communicate with development network 120 using private network 224.

Development network 120 again includes developer computing device 112. DCA computing device 232 establishes VPN connection 228 with developer computing device 112, such that developer computing device 112 is assigned an additional network address associated with production network 130. In other words, DCA computing device 232 simulates developer computing device 112 "plugging in" to production network 130, such that developer computing device 112 may directly address devices on production network 130, such as production computing device 134.

Developer computing device 112 establishes direct connection 226 with production computing device 134 based on the private network address of production computing device 134, associated with production network 130. In the example embodiment, direct connection 226 includes TCP/IP traffic.

Direct connection 226 implements the developer computing device 112 being directly connected to production network 130. However, DCA computing device 232 facilitates direct connection 226 using private network 224 and VPN connection 228. In other words, DCA computing device 232 coordinates two layers of network routing to enable direct connection 226.

Figure 3A:
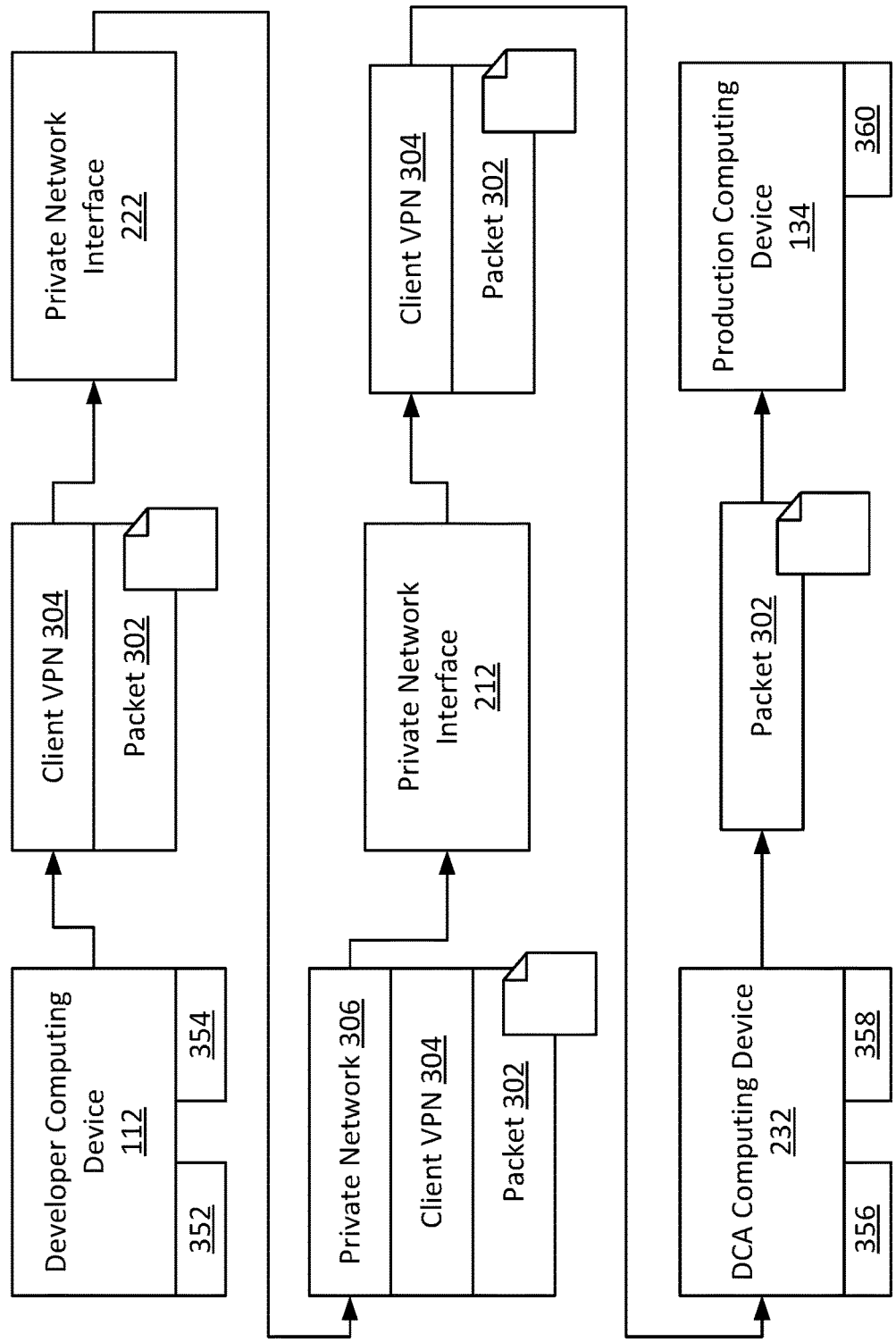
FIG. 3A is a simplified block diagram illustrating network data flow between from a developer computing device to a production computing device.

FIG. 3A is a simplified block diagram illustrating network data flow between developer computing device 112 and production computing device 134 via DCA computing device 232. More specifically, FIG. 3A illustrates network data flow from developer computing device 112 to production computing device 134. With reference to FIGS. 2 and 3, DCA computing device 232 establishes direct connection 226 such that data may be exchanged between developer computing device 112 and production computing device 134.

Developer computing device 112 is, in the example embodiment, physically connected to development network 120, such as a corporate office Ethernet network. Developer computing device 112 has a first developer network address 352 associated with development network 120.

DCA computing device 232 is connected to development network 120 using private network 224 (shown in FIG. 2), such that DCA computing device 232 has a first DCA network address 356 associated with development network 120. More specifically, development private network interface 222 is connected to development network 120, and production private network interface 212 is connected to DCA computing device 232. In the example embodiment, private network interfaces 222 and 212 establish a MPLS connection, such that DCA computing device 232 is in communication with development network 120. In alternate embodiments, private network interfaces 222 and 212 may establish a network-to-network VPN connection.

DCA computing device 232 is further connected to production network 130, such that DCA computing device 232 has a second DCA network address 358 associated with production network 130. In the example embodiment, production network 130 is a VLAN provided by a cloud services platform 110. Production network 130 includes production computing device 134, having resource address 360 on production network 130.

VPN connection 228 is established between developer computing device 112 and DCA computing device 232, such that developer computing device 112 has a second developer network address 354 associated with production network 130. More specifically, developer computing device 112 instantiates a virtual network adapter associated with address 354 based on a VPN configuration received from DCA computing device 232. Thus, developer computing device 112 uses address 354 on production network 130 to establish direct connection 226 to production computing device 134.

In operation, developer computing device 112 generates a packet 302, including a data payload. For example, packet 302 may include updated configuration data for a web server on production network 130. Packet 302 is addressed to production computing device 134 based on address 360. In other words, packet 302 is addressed as if developer computing device 112 were directly connected to production network 130. Developer computing device 112 transmits packet 302 to a virtual network adapter associated with address 354 and production network 130.

In one embodiment, packet 302 includes an Open Database Connectivity (ODBC) connection or a Java Database Connectivity (JDBC) connection. For example, packet 302 may be used to configure a database, such as production computing device 134.

Developer computing device 112 uses the virtual network adapter associated with address 354 to encapsulate packet 302 as client VPN packet 304. Client VPN packet 304 is addressed to DCA computing device 232 on development network 120, using address 356, based on the VPN configuration received from DCA computing device 232. Client VPN packet 304 is further configured to be routed over private network 224 to DCA computing device 232. Developer computing device 112 transmits client VPN packet 304, including packet 302, to development private network interface 222. In some embodiments, client VPN packet 304 is encrypted with an encryption key associated with the destination production network (e.g., production network 130).

In the example embodiment, private network 224 is a MPLS network. Development private network interface 222 encapsulates client VPN packet 304 as private network packet 306, which is configured to cause private network 224 to route private network packet 306 to production private network interface 212. For example, private network packet 306 may include multiple path labels identifying a specific network path. Private network packet 306 may be encrypted using an encryption key associated with private network 224 and/or development network 120. For example, multiple developer computing devices may use a similar encryption key to encrypt data associated with private network 224.

Production private network interface 212 receives and de-encapsulates private network packet 306 as client VPN packet 304. Private network interface 212 transmits client VPN packet 304 to address 356 of DCA computing device 232 on development network 120.

DCA computing device 232 de-encapsulates client VPN packet 304 as packet 302, directed to address 360 on production network 130, as described above. DCA computing device 232 transmits packet 302 to production computing device 134 based on address 360. Production computing device 134 retrieves the data payload from packet 302.

Figure 3B:
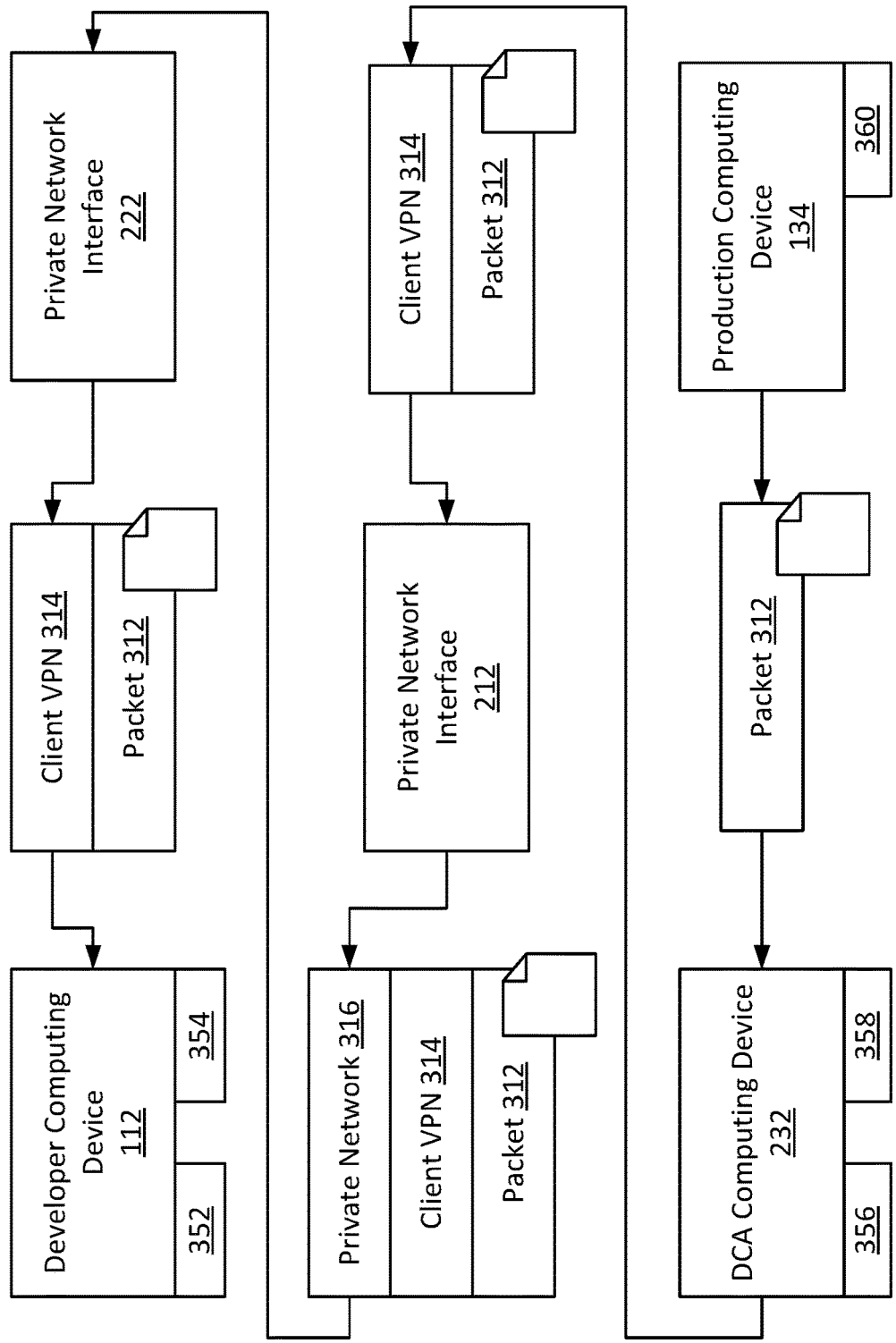
FIG. 3B is a simplified block diagram illustrating network data flow from the production computing device to the developer computing device.

FIG. 3B is a simplified block diagram illustrating network data flow from production computing device 134 to developer computing device 112. For example, developer computing device 112 may receive a response from production computing device 134. In operation, production computing device 134 generates a packet 312, including a data payload. For example, packet 312 may be a status response to developer computing device 112, such as indicating an updated configuration was applied to a web server on production network 130. Response packet 312 is addressed to developer computing device using second developer network address 354. In other words, production computing device 134 addresses developer computing device 112 as if developer computing device 112 were directly connected to production network 130.

DCA computing device 232 receives response packet 312 at network address 358 from production computing device 134, encapsulates packet 312 as client VPN packet 314, and transmits client VPN packet 314 to production private network interface 212. Client VPN packet 314 is directed to address 352 (e.g., the address on the development network) of developer computing device 112, and includes response packet 312.

Production private network interface 212 encapsulates client VPN packet 314 as private network packet 316, which is configured to cause private network 224 to route private network packet 316 to developer private network interface 222. Development private network interface 222 receives and de-encapsulates private network packet 316 as client VPN packet 314, which is then routed to network address 352 as specified in client VPN packet 314.

Developer computing device 112 receives client VPN packet 314 from development private network interface 222, and unpacks client VPN packet 314 as response packet 312.

Figure 4:
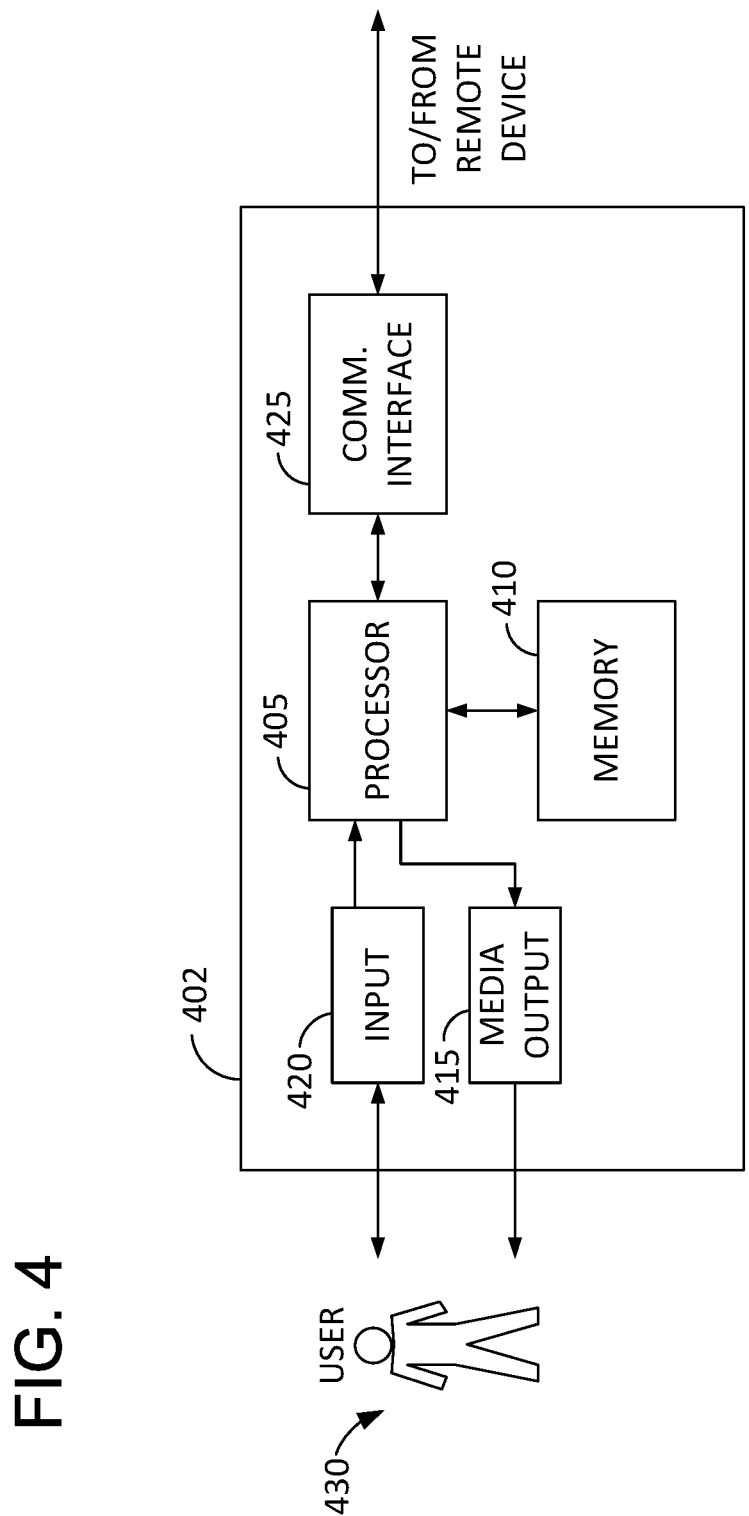
FIG. 4 illustrates an example configuration of a user device for the system shown in FIGS. 2, 3A, and 3B.

FIG. 4 depicts a user computing device 402 that may be used to implement developer computing device 112 (shown in FIG. 2). Computing device 402 includes a processor 405 for executing instructions. In some embodiments, executable instructions are stored in a memory area 410. Processor 405 includes one or more processing units (e.g., in a multi-core configuration). Memory area 410 is any device allowing information such as executable instructions and/or other data to be stored and retrieved. Memory area 410 includes one or more computer-readable media.

Computing device 402 also includes at least one media output component 415 for presenting information to a user 430. Media output component 415 is any component capable of conveying information to user 430. In some embodiments, media output component 415 includes an output adapter, such as a video adapter and/or an audio adapter. An output adapter is operatively coupled to processor 405 and operatively coupleable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 415 is configured to present an interactive user interface (e.g., a web browser or client application) to user 430.

In some embodiments, computing device 402 includes an input device 420 for receiving input from user 430. Input device 420 includes, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 415 and input device 420.

Computing device 402 also includes a communication interface 425, which is communicatively coupleable to a remote device. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 430 via media output component 415 and, optionally, receiving and processing input from input device 420. A user interface may include, among other possibilities, a web browser and a client application. Web browsers enable users 430 to display and interact with media and other information typically embedded on a web page or a website from a web server. A client application allows users 430 to interact with a server application associated with.

Figure 5:
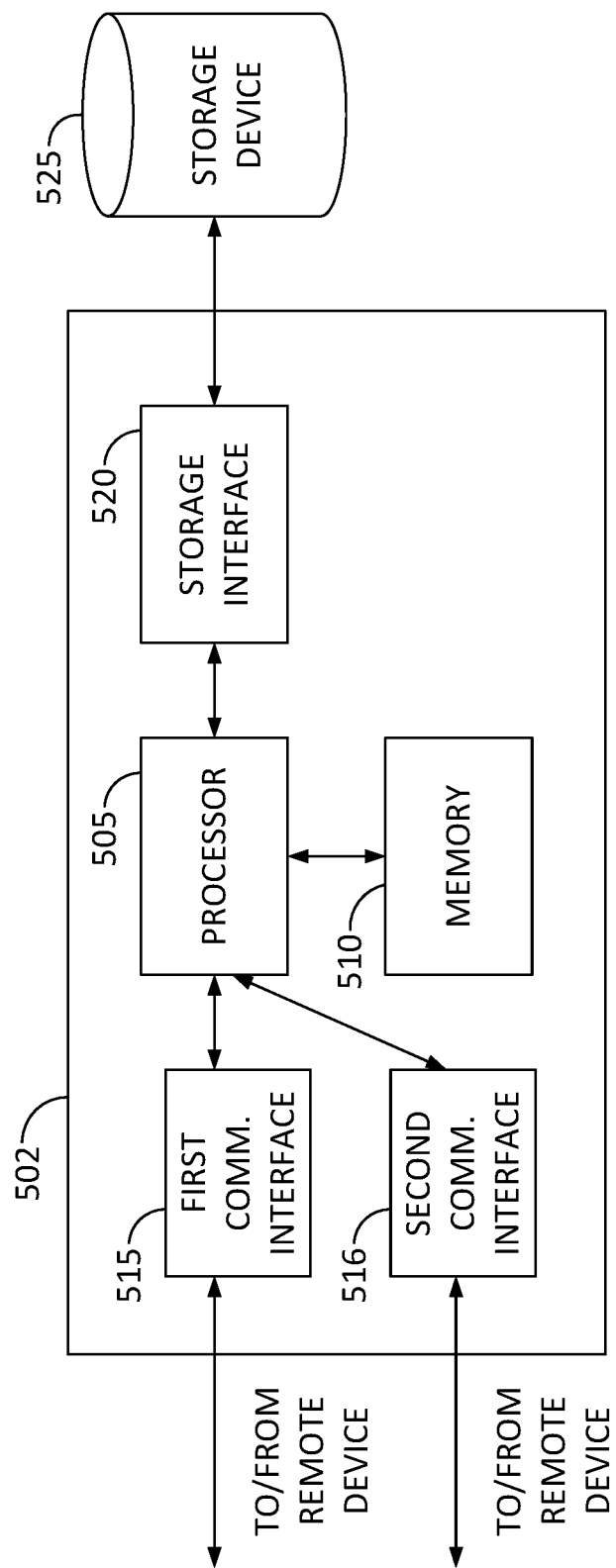
FIG. 5 is a schematic diagram of an example server computing device that maybe used with the computer system shown in FIG. 2.

FIG. 5 depicts an exemplary host computing device 502 that may be used to implement DCA computing device 232 and/or production computing device 134. Host computing device 502 includes a processor 505 for executing instructions. Instructions are stored in a memory area 510, for example. Processor 505 includes one or more processing units (e.g., in a multi-core configuration).

Processor 505 is operatively coupled to a first communication (i.e., network) interface 515 and a second communication interface 516 such that host computing device 502 is capable of communicating with remote device(s) such as computing device 402 shown in FIG. 4 and/or other host computing device(s) 502. In some embodiments, communication interface 515 and/or communication interface 516 is a virtual interface. In certain embodiments, each of communication interface 515 and communication interface 516 is associated with a respective network address, such as an IP address. In other embodiments, communication interface 515 and/or communication interface 516 are associated with physical network links. For example, communication interface 515 may receive network packets from a user computing device 402 via Ethernet, using a switching device.

Processor 505 is operatively coupled to a storage device 525. Storage device 525 is any computer-operated hardware suitable for storing and/or retrieving data. In some embodiments, storage device 525 is integrated in host computing device 502. For example, host computing device 502 may include one or more hard disk drives as storage device 525. In other embodiments, storage device 525 is external to host computing device 502 and is accessed by a plurality of host computing devices 502. For example, storage device 525 may include multiple storage units such as hard disks or solid state disks in a redundant array of inexpensive disks (RAID) configuration. Storage device 525 may include a storage area network (SAN) and/or a network attached storage (NAS) system.

In some embodiments, processor 505 is operatively coupled to storage device 525 via a storage interface 520. Storage interface 520 is any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 525.

Memory areas 410 (shown in FIG. 4) and 510 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Figure 6:
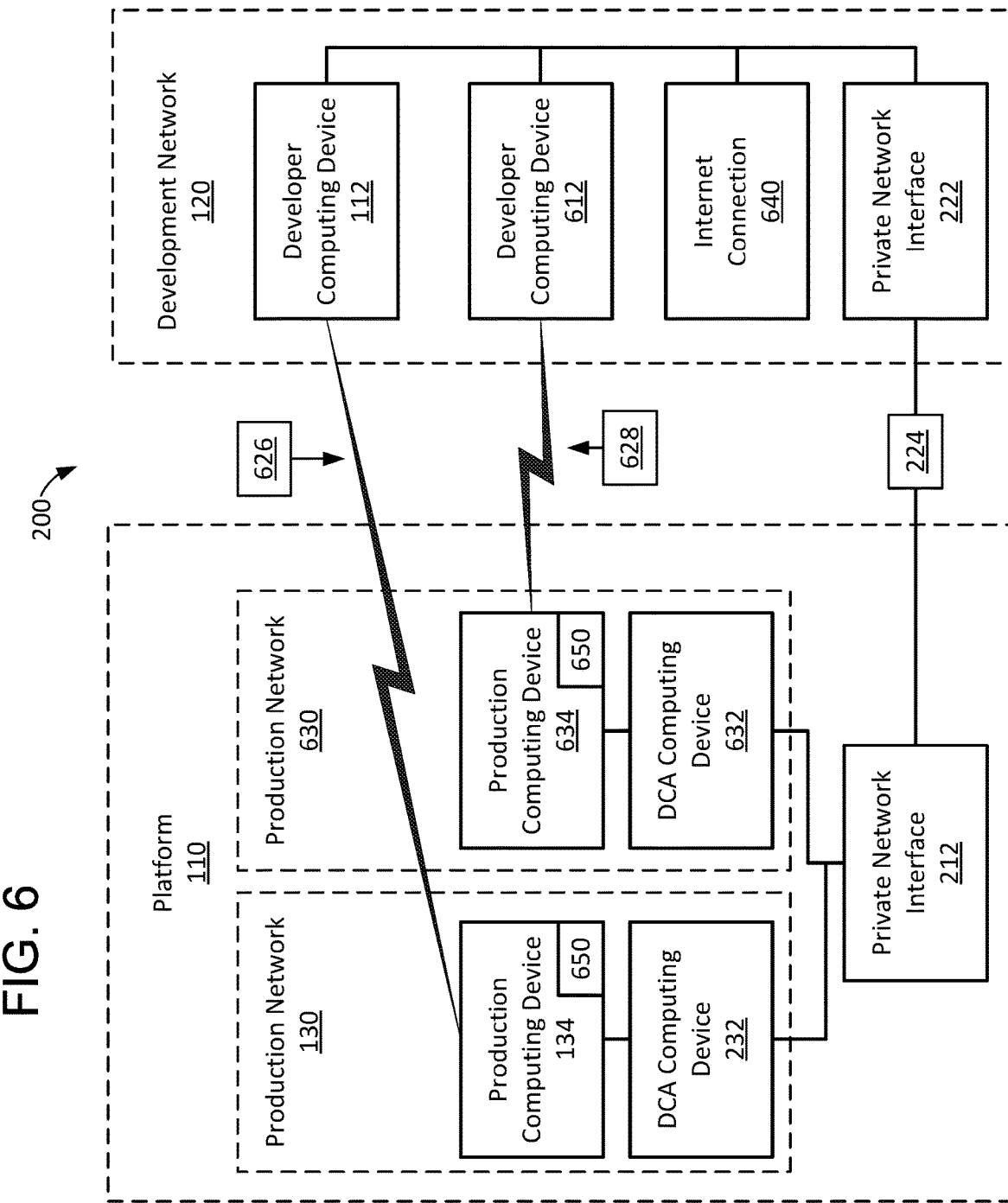
FIG. 6 is a schematic diagram illustrating an example direct cloud access (DCA) system including multiple DCA computing devices.

FIG. 6 is a schematic diagram illustrating an example embodiment of direct cloud access (DCA) computing system 200 including multiple DCA computing devices, such as DCA computing devices 232 and 632. In the example embodiment, cloud services platform 110 provides production network 130 and production network 630. Production network 130 includes production computing device 134, which is configured to host an end user website (e.g. providing financial data). Production network 630 includes production computing device 634, which is configured to store private data (e.g., payment card identifiers).

Production network 630 is isolated from production network 130, e.g. to prevent unauthorized access to the private data from the end user website. Due to the network isolation, devices on networks 130 and 630 may have identical network addresses. In the example embodiment, production computing device 134 and production computing device 634 each have an identical network address 650 on their respective production networks. Due to the identical network address 650, production computing device 134 and production computing device 634 cannot both directly connect to development network 120 without jeopardizing system stability.

Further, production network 630 may have data protection standards (e.g., encryption strength, authentication requirements) that would be excessively resource intensive to apply to production network 130 and/or development network 120.

DCA computing devices 232 and 632 allow developer computing devices (e.g., 112, 612) to selectively "plug in" to production network 130 or 630 as needed. For example, developer computing device 112 may connect to DCA computing device 232 to connect with production computing device 134 using address 650. Similarly, developer computing device 612 may connect to DCA computing device 632 to connect with production computing device 634 using address 650.

In the example embodiment, DCA computing devices 232 and 632 are directly addressable from development network 120. For example, developer computing device 112 may discover and connect to DCA computing device 232 through private network 224. Private network 224 prevents DCA computing device 232 from being discoverable and/or accessible over the internet.

Developer computing device 112 and developer computing device 612 are both connected to development network 120. Production computing devices 134 and 634 cannot both be connected to development network 120, because they each have identical network address 650 on their respective production networks 130 and 630. Instead, DCA computing devices 232 and 632 are used to provide conditional access to production networks 130 and 630, respectively. For example, developer computing device 612 connects to production computing device 634 using DCA computing device 632, while developer computing device 112 connects to production computing device 134 using DCA computing device 232. In other words, DCA computing devices 232 and 632 allow developer computing devices 112 and 612 to independently connect to a production network as needed.

More generally, production networks 130 and 630 have conflicting address ranges. For example, independent production networks 130 and 630 use the same IP address prefix. In other words, as noted above, devices in different production networks 130 and 630 may share an identical IP address. In isolated operation, this address conflict may not be significant. However, absent DCA computing system 200, the address conflict would inhibit developer computing devices 112 and 612 on development network 120 from functioning properly when connected to multiple production networks. DCA computing device 232 and 632 enable developer computing devices 112 and 612 to easily selectively "plug-in" to production networks 130 and 630, and further to switch connections between production networks 130 and 630 while maintaining network security. For example, developer computing device 112 is capable of switching between production network 130 and production network 630 by selectively connecting to the associated DCA computing device 232 or 632.

In the example embodiment, developer computing device 112 has connection 626 to production computing device 134 based on network address 650. Developer computing device 112 is connected to production network 130 using DCA computing device 232, in addition to being connected to development network 120. Similarly, developer computing device 612 has connection 628 to production computing device 634 based on network address 650. In other words, DCA computing device 632 allows developer computing device 612 to reliably connect to production computing device 634 despite production computing device 134 having a conflicting network address.

Additionally, connections 626 and 628 do not interfere with the normal operations of development network 120. For example, developer computing device 112 may be in communication with developer computing device 612 in addition to production computing device 134.

Similarly, developer computing device 612 may be in communication with production computing device 634 and the internet (e.g., internet connection 640). However, connection 628 is not routed through internet connection 640, and is instead routed over private network 224 using private network interfaces 222 and 212.

Figure 7:
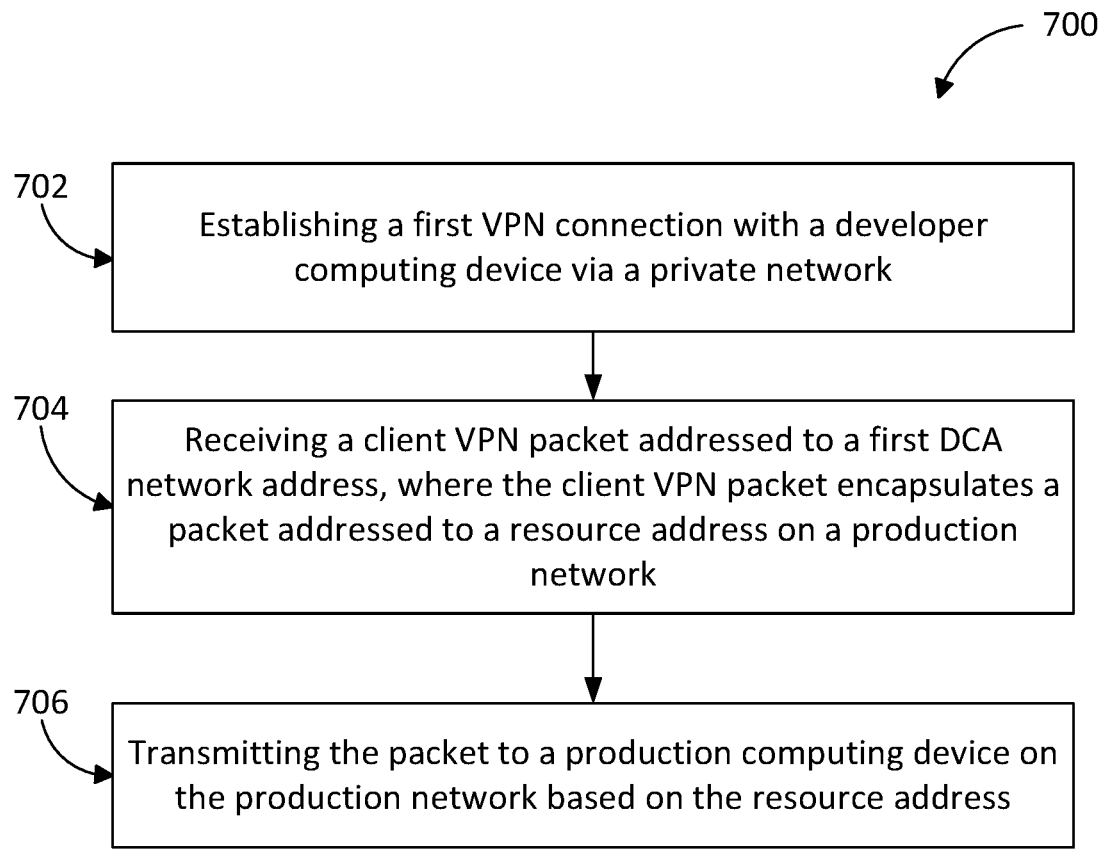
FIG. 7 is a flowchart illustrating an example method for routing data packets between private networks using encapsulation, which may be implemented using the DCA system shown in FIG. 2.

FIG. 7 is a flowchart illustrating an example method 700 for enabling access by a developer computing device hosted on a development network to a plurality of production networks hosted on a cloud services platform. Method 700 may be implemented using at least one computing device, for example, DCA computing device 232 and/or DCA computing device 632 (shown in FIG. 6), in cooperation with DCA computing system 200.

In the example embodiment, method 700 includes establishing 702 a first VPN connection with a developer computing device via a private network, wherein the DCA computing device is assigned a first DCA network address associated with the development network, and wherein the developer computing device is assigned a second developer network address associated with the respective production network and is provided with a resource address of a production computing device on the production network. Method 700 also includes receiving 704 a client VPN packet addressed to the first DCA network address, wherein the client VPN packet encapsulates a packet generated by the developer computing device and addressed to the resource address on the production network, and transmitting 706 the packet to the production computing device based on the resource address.

In some embodiments, method 700 includes additional and/or alternative steps in accordance with capabilities of DCA computing system 200 described above.

As will be appreciated based on the foregoing specification, the above-described embodiments of the disclosure is implemented using computer programming or engineering techniques including computer software, firmware, hardware or any combination or subset thereof, wherein the technical effects described above are achieved. Any such resulting program, having computer-readable code means, is embodied or provided within one or more computer-readable media, thereby making a computer program product, (i.e., an article of manufacture), according to the discussed embodiments of the disclosure. The computer-readable media is, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code is made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A direct cloud access (DCA) computing system for enabling access by a developer computing device hosted on a development network to a plurality of production networks hosted on a cloud services platform, said DCA computing system comprising:
   a development private network interface hosted on the development network and configured to couple the development network to a private network, wherein the developer computing device has a first developer network address associated with the development network;
   a production private network interface hosted on the cloud services platform and configured to couple the plurality of production networks to the private network; and
   a plurality of DCA computing devices each coupled to a respective one of the plurality of production networks, each DCA computing device having a corresponding second DCA network address associated with the respective production network, each DCA computing device comprising a processor and a memory in communication with the processor, the processor programmed to:
      establish a first VPN connection with the developer computing device via the private network, wherein the DCA computing device is assigned a first DCA network address associated with development network, and wherein the developer computing device is assigned a second developer network address associated with the respective production network and is provided with a resource address of a production computing device on the respective production network, the resource address conflicting with an identical resource address on another production network of the plurality of production networks;
      receive a client VPN packet addressed to the first DCA network address, wherein the client VPN packet encapsulates a packet generated by the developer computing device and addressed to the resource address on the respective production network; and
      transmit the packet to the production computing device based on the resource address.

2. The DCA computing system of claim 1, wherein the private network is a MPLS route associated with the cloud services platform.

3. The DCA computing system of claim 1, wherein the private network is a site-to-site VPN connection, and wherein the private network is encrypted with a first encryption key associated with the development network.

4. The DCA computing system of claim 3, wherein the first VPN connection is encrypted with a second encryption key associated with the respective production network.

5. The DCA computing system of claim 1, wherein the production computing device is a database server.

6. The DCA computing system of claim 5, wherein the packet includes at least one of an Open Database Connectivity (ODBC) connection and a Java Database Connectivity (JDBC) connection.

7. The DCA computing system of claim 1, wherein the plurality of DCA computing devices are discoverable on the development network.

8. The DCA computing system of claim 1, wherein the processor is further programmed to establish a second VPN connection with a second developer computing device associated with the development network.

9. A computer-implemented method for enabling access by a developer computing device hosted on a development network to a plurality of production networks hosted on a cloud services platform, said method implemented using a direct cloud access (DCA) computing system, wherein the DCA computing system includes a plurality of DCA computing devices each coupled to a respective one of the plurality of production networks, each DCA computing device having a corresponding second DCA network address associated with the respective production network, each DCA computing device comprising a processor and a memory in communication with the processor, said method comprising:
   establishing, by a first DCA computing device of the plurality of DCA computing devices, a first VPN connection with the developer computing device via a private network, wherein the first DCA computing device is assigned a first DCA network address associated with the development network, wherein the developer computing device is assigned a second developer network address associated with the respective production network and is provided with a resource address of a production computing device on the respective production network, the resource address conflicting with an identical resource address on another production network of the plurality of production networks, wherein the development network includes a development private network interface configured to couple the development network to the private network, and wherein the developer computing device has a first developer network address associated with the development network;
   receiving, by the first DCA computing device, a client VPN packet addressed to the first DCA network address, wherein the client VPN packet encapsulates a packet generated by the developer computing device and addressed to the resource address on the respective production network, wherein the cloud services platform includes a production private network interface configured to couple the plurality of production networks to the private network; and
   transmitting, by the first DCA computing device, the packet to the production computing device based on the resource address.

10. The computer-implemented method of claim 9, wherein the private network is a MPLS route associated with the cloud services platform.

11. The computer-implemented method of claim 9, wherein the private network is a site-to-site VPN connection, and the private network is encrypted with a first encryption key associated with the development network.

12. The computer-implemented method of claim 11, wherein the first VPN connection is encrypted with a second encryption key associated with the respective production network.

13. The computer-implemented method of claim 9, wherein the production computing device is a database server.

14. The computer-implemented method of claim 13, wherein the packet includes at least one of an Open Database Connectivity (ODBC) connection and a Java Database Connectivity (JDBC) connection.

15. The computer-implemented method of claim 9, wherein the plurality of DCA computing devices are discoverable on the development network.

16. The computer-implemented method of claim 9, further comprising establishing, by the first DCA computing device, a second VPN connection with a second developer computing device via the private network.

17. A non-transitory computer-readable storage media having computer-executable instructions embodied thereon, the instructions executable by at least one processor of one of a plurality of DCA computing devices each coupled to a respective one of a plurality of production networks, each DCA computing device having a corresponding second DCA network address associated with the respective production network, each DCA computing device comprising a memory in communication with the at least one processor, wherein when executed, the computer-executable instructions cause the at least one processor to:

establish a first VPN connection with a developer computing device hosted on a development network, the first VPN connection established via a private network, wherein the DCA computing device is assigned a first DCA network address associated with the development network, wherein the developer computing device is assigned a second developer network address associated with the respective production network and is provided with a resource address of a production computing device on the respective production network, the resource address conflicting with an identical resource address on another production network of the plurality of production networks, wherein the development network includes a development private network interface configured to couple the development network to the private network, and wherein the developer computing device has a first developer network address associated with the development network;

receive a client VPN packet addressed to the first DCA network address, wherein the client VPN packet encapsulates a packet generated by the developer computing device and addressed to the resource address on the respective production network, and wherein a cloud services platform includes a production private network interface configured to couple the plurality of production networks to the private network; and transmit the packet to the production computing device based on the resource address.

18. The computer-executable instructions of claim 17, wherein the computer-executable instructions further cause the at least one processor to establish a second VPN connection with a second developer computing device via the private network.

* * * * *